United States Patent [19]

Alvin

[11] Patent Number: 5,057,347

[45] Date of Patent: Oct. 15, 1991

[54] APPARATUS AND TAPE FOR SPLICING DATA PROCESSING WEBS AND MOUNTING MATERIAL THEREON

[76] Inventor: William R. Alvin, 12173 S. Dixie Hwy., Miami, Fla. 33156

[21] Appl. No.: 410,034

[22] Filed: Sep. 21, 1989

Related U.S. Application Data

[63] Continuation of Ser. No. 55,373, May 29, 1987, abandoned.

[51] Int. Cl.[5] .......... B32B 3/10; B65H 69/06

[52] U.S. Cl. .......... 428/43; 156/157; 156/304.3; 428/61; 428/134; 428/137; 428/194; 428/220; 428/343; 428/356; 428/900

[58] Field of Search .......... 156/157, 304.3, 505; 428/43, 61, 131, 134, 356, 900, 194, 220, 137

[56] References Cited

U.S. PATENT DOCUMENTS

| | | | |
|---|---|---|---|
| 1,740,215 | 12/1929 | Allen | 156/505 |
| 2,506,933 | 5/1950 | Mercer | 156/505 |
| 2,744,031 | 5/1956 | Mumma | 428/323 |
| 2,794,488 | 6/1957 | Fritzinger | 156/506 |
| 2,797,370 | 6/1957 | Bennett | 335/303 |
| 2,800,214 | 7/1957 | Symonds | 400/529 |
| 2,827,104 | 3/1958 | Rives | 156/505 |
| 2,994,362 | 8/1961 | Hall | 156/505 |
| 3,082,866 | 3/1963 | Kessman | 156/505 |
| 3,137,603 | 6/1964 | Haynes | 156/157 |
| 3,139,292 | 6/1964 | Swyden | 282/29 R |
| 3,290,201 | 12/1966 | Jorgensen | 156/505 |
| 3,475,263 | 10/1969 | Kapilow et al. | 156/157 |
| 3,484,097 | 12/1969 | Jory | 270/52 |
| 3,669,814 | 6/1973 | Faltin | 428/43 |
| 3,694,294 | 9/1972 | Cafiero | 156/507 |
| 3,769,140 | 10/1973 | Sayer | 156/157 |
| 3,776,795 | 12/1973 | Stevenson | 156/505 |
| 3,914,491 | 10/1975 | Takahashi | 156/157 |
| 3,983,276 | 9/1976 | Matsumoto | 428/40 |
| 4,056,426 | 11/1977 | Sipin | 156/505 |
| 4,066,206 | 1/1978 | Peterson | 229/69 |
| 4,070,223 | 1/1978 | Stalzer | 156/264 |
| 4,234,378 | 11/1980 | Iwasaki et al. | 162/138 |
| 4,239,582 | 12/1980 | McGrath | 156/565 |
| 4,252,597 | 2/1981 | Monroe | 156/505 |
| 4,285,531 | 8/1981 | Balsamo | 428/43 |
| 4,289,556 | 9/1981 | Booth | 156/506 |
| 4,390,389 | 6/1983 | Bunas et al. | 156/502 |
| 4,421,590 | 12/1983 | Meschi | 156/157 |
| 4,448,558 | 5/1984 | Weingarten | 282/11.5 A |
| 4,487,645 | 12/1984 | Weston | 156/157 |
| 4,525,399 | 6/1985 | Fields | 428/43 |
| 4,545,517 | 10/1985 | Olson | 226/92 |
| 4,591,146 | 5/1986 | Sasso | 271/275 |
| 4,759,484 | 7/1988 | Richter | 428/137 X |

FOREIGN PATENT DOCUMENTS

| | | | |
|---|---|---|---|
| 162685 | 9/1983 | Japan | 428/356 |

OTHER PUBLICATIONS

NEBS Catalog, "Computer Forms and Supplies" (Fall-Winter 1986), GB2072, pp. 18, 29, 31, 41 and 43.

*Primary Examiner*—Michael Wityshyn
*Attorney, Agent, or Firm*—Penrose L. Albright

[57] ABSTRACT

A combined splicing tape and peg board for connecting ends of continuous feed computer paper to facilitate changing between different paper products or to add leaders so that the first serial numbered check or invoice is not lost to the feed process. The apparatus enables non-continuous feed paper products, such as envelopes or checks, to be integrated into a continuous feed paper flow. Continuous feed paper products are abutted at their ends on the adhesive side of a previously mounted tape. Non-continuous feed products are mounted on the tape and then onto the front side of the continuous feed paper in the printer. Spaced holes in the computer paper are freely received by rigid pegs positioned and sized for proper alignment of the edges of the paper. The tape has spaced holes for proper alignment over the edges of the paper. In one embodiment the tape holes are slightly smaller than the pegs to retain the tape on the board. In a further embodiment the tape contains magnetically attracted material drawn to a magnetic strip in the board to firmly hold it in place. In another embodiment, the paper is first placed on the peg board where hinged end clips retain the paper in place and the splicing tape is then applied, adhesive side down. The tape, with preferably non-permanent adhesive, may be in rolls and cut on the peg board's serrated edge or in strips pre-cut to correct lengths in pads or on backing sheets like peel-off labels.

16 Claims, 6 Drawing Sheets

APPARATUS AND TAPE FOR SPLICING DATA PROCESSING WEBS AND MOUNTING MATERIAL THEREON

This application is a continuation of Ser. No. 07/055,373, filed May 29, 1987, now abandoned.

FIELD OF INVENTION

This invention relates to an apparatus and method of splicing together the ends of data and word processing continuous webs of paper, envelopes, forms or other material and for mounting non-continuous envelopes, checks, forms, sheets or other material thereon, and further relates to tapes and strips for use with the method and apparatus.

BACKGROUND

With the advent of computers and word processing equipment there has been a growing and widespread use of continuous computer print-out data and paper forms for a number of typing, printing and office purposes. It has been long known that it is advantageous to splice the ends of such data processing paper and forms to avoid delays adherent in inserting a new web of same into the printer. Sophisticated splicing machines have been provided for this purpose such as, for example, the splicing machine and method disclosed in U.S. Pat. No. 4,252,597 of J. Monroe which issued Feb. 24, 1981. In addition, relatively simple splicing kits have been provided comprising boards having register pins to provide form alignment which are used together with perforated pressure sensitive permanent adhesive tape so the webs can be separated after printing without damage thereto as disclosed in U.S. Pat. No. 4,390,389 of Bunas issued Jan. 28, 1983.

To prevent the loss or damage to the first envelope, check, and the like material of continuous computer webs, when initially inserting or introducing said webs into the printer, it is desirable to attach a leader or leader type device to said webs. Such devices are disclosed in U.S. Pat. No. 4,070,223 of Stalzer issued Jan. 24, 1978.

Kits are also provided for applying non-continuous envelopes and the like to continuous web-like devices whereby addresses or other material can be printed thereon as the web-like device with envelopes or the like mounted thereon, is received through the printer. Attention is invited to the disclosures of U.S. Pat. No. 4,448,558 of Weingarten issued May 5, 1984 and U.S. Pat. No. 3,139,292 of P. Swyden issued June 30, 1964.

Inasmuch as data processing forms are provided with regular perforations along their edges, alignment of the adjacent ends of the data processing forms can be accomplished relatively easily by providing pins on a board which can be received in the perforations. However, alignment of the splicing tape or strip per se, has presented more of a problem and this is particularly so if the tape is to be applied under the edges of the data processing forms to be joined. In U.S. Pat. No. 4,239,582 of T. McGrath issued Dec. 16, 1980, a groove is provided into which the tape is received. However, such a groove, of necessity must be very shallow whereby the tape can be easily displaced or there must be a semi-curvilinear positioning of the tape or the bottom of the groove must be movable upwardly to bring the tape into contact with the edges of the paper, all of which requires a somewhat complex mechanism and may present difficulties if the tape becomes unfavorably skewed in the groove or adheres to the sides of the groove before the bottom is raised.

When mounting non-continous materials such as envelopes or checks to a web-like device, one must first remove the continuous data processing paper or form currently in the printer and then, often with difficulty, feed or insert the web-like device with attached envelopes or checks on the like into the printer. Frequently the envelopes or checks or the like slip out of the web-like device entirely or become misaligned. In addition the web-like device itself, because of its pockets or folds, creating additional thickness or projections, may be caught up in the printer mechanism.

A complicating factor is that the distance across computer webs of different sizes or widths between the margins' perforations is not divisable by a standard or single unit of length, so that any structure or apparatus for positioning splicing tape relative to computer webs of various widths should be adaptable to these dimensional differences.

It will be appreciated that there is a need for a relatively simple apparatus and method for splicing adjacent ends of computer data form webs, for attaching leaders to said webs and for mounting non-continous envelopes and the like on to such webs so that material can be printed thereon without being biased, without the interference of the holding tape or strip, and without removing the web currently in the printer.

SUMMARY OF THE INVENTION

The invention involves the use of tape comprising rolls of elongated strips which are provided with non-permanent pressure sensitive adhesive on at least one side and which have a plurality of pairs of regularly spaced perforations or openings which each are approximately the same size and are spaced "vertically" apart, across the parallel longer edges of the tapes, approximately the same distance as the perforations or openings in the data processing webs so that the tape can be superimposed over the webs' transverse juxtaposed two edges whereby openings in the tape match the openings or perforations in the web and whereby both corresponding openings are received in the sprocket projections of the printer while retaining the transverse edges of the web in juxtaposition as they are drawn through the printer. Alternatively the invention involves the use of elongated strips in pads or attached to a base of paper or plastic which are provided with non-permanent pressure sensitive adhesive on at least one side with a pair of regularly spaced perforations or openings on each end of said strips which are approximately the same size and are spaced "vertically" apart, across the parallel longer edges of the strips, the same or almost the same distance as the perforations or openings in the data processing webs so that each strip can be superimposed over the webs' transverse juxtaposed two edges whereby openings in the strip match the openings or perforations in the web and whereby both corresponding openings are received in the sprocket projections of the printer while retaining the transverse edges of the web in juxtaposition as they are drawn through the printer.

To maintain the tape or strip in alignment with the transverse edges, whether the tape or strip is placed over or under such edges, a magnetic strip is provided in the underlying surface of the retaining base which is flush or almost flush with the surface of the base and the tape or strip is provided with a material which is attracted to magnets. This assures not only that the tape or strip is aligned but also that the tape or strip is urged to be flush with the surface of the underlying support. When the tape or strip is placed above the matching edges of the two webs with its adhesive side down, the matching edges are, in effect, squeezed to some extent between the tape or strip and the magnet in the supporting surface. With the tape or strip positioned and held by the magnet in the underlying surface of the retaining base, there is no need for the person splicing the two ends together to be holding the tape or strip with one hand while attempting to align the edge of one web with the other.

Preferably the openings of the tape or strip are not smoothly circular but rather the edges defining the openings are serrated so that they grip the pins of the retaining base and the printer sprockets more securely and, at the same time, provide a certain tolerance needed for slightly different diameters of the pins or sprockets and for differences in the "horizontal" distance between openings in webs which, in theory, should be identical, but in fact may vary as much as 0.05 inches. Nonetheless, the invention can be practiced satisfactorly with holes or openings which are not serrated.

The retaining base, or peg board as it may be termed, is provided with a saw edge or has serrations molded or cut therein so that the tape can be easily torn to the correct length whereby the tape together with the spliced webs or materials mounted thereon by the tape move through the printer without undue difficulty. These molded or cut in edges are not utilized when the alternative strips (pre-cut to exact length) are used with the apparatus.

An important object of the combined peg board, tape or strip, magnet and magnetic material in the tape or strip is to permit the user to splice adjacent webs or to mount material on the webs quickly and easily and without undue concern about alignment of either the tape (strip) or the webs or material being held by the tape or strip. In fact, these operations may even be carried out while the printer is operating and can be accomplished with little practice in a matter of seconds.

Alternatively tape or strips not provided with magnetically attracted material can be utilized by making the perforations or openings in the tape or strips about one sixty-fourth of an inch smaller than the pegs or pins of the retaining base utilizing a friction grip to align and hold the tape or strip.

Objects of the invention which have not been delineated other than set forth above and other objects, adaptabilities, capabilities and advantages of the invention will become apparent or otherwise occur to those skilled in the art from the following description of embodiments of the invention, reference being had to the accompanying drawings in which:

DESCRIPTION OF THE PREFERRED EMBODIMENTS

Figure 1:
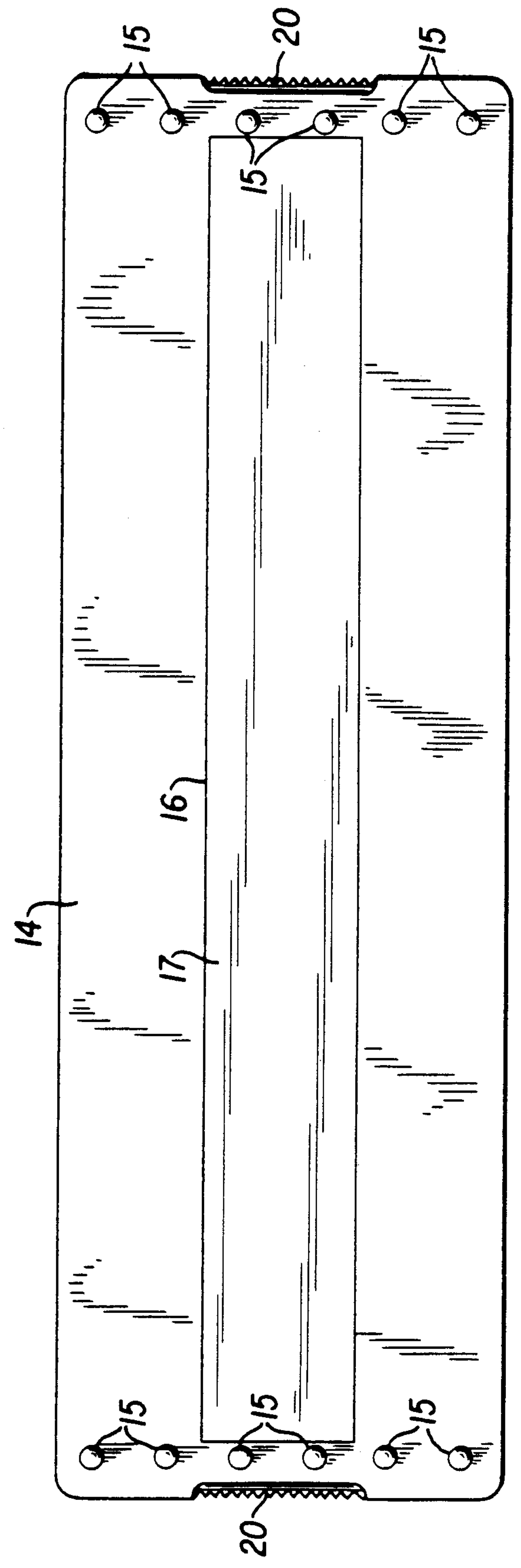
FIG. 1 is a plan view of a preferred embodiment of a peg board as used in the invention.

Referring to FIG. 1, a peg board 14 which is preferably composed of plastic but may also be made of metal, wood or other suitable relatively rigid material, is provided with a plurality of pegs or pins 15 which are aligned to match the perforations along the vertical (when being drawn into the roller of the word-processing printer) sides of continuous data processing form webs and are therefore one-half inch apart center to center parallel to the short edges of peg board 14 and are 9.0156 inches, in this embodiment, horizontally from center to center parallel to the longer edges of peg board 14. This distance, 9.0156 inches, has been found empirically and is critical for holding 9 9/16" wide webs without undue tension or causing same to buckle.

Figure 2:
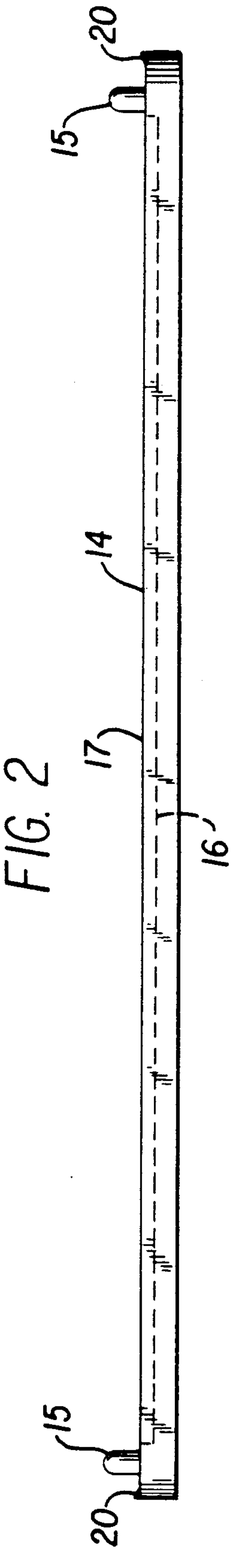
FIG. 2 is a side elevation of the peg board shown in FIG. 1.

Peg board 14 is provided with a central rectangular depression 16 which is one inch wide and approximately eight and three-quarter inches in length. Its depth is about one-sixteenth of an inch and it receives a flexible permanent magnetic strip 17 the top of which is flush with the peg board surface. When non-magnetically attracted tapes or strips are utilized, depression 16 and magnetic strip 17 are, of course, not necessary; such a board is portrayed in FIG. 4D as peg board 14*c* which is otherwise identical to board 14. The shorter ends of peg board 14 have a plurality of serrations 20, preferably molded therein, with points and edges which are sufficiently sharp for the purpose of cutting the tape by pulling same downwardly as seen in FIG. 2 along the serrations 20 once same is in place. Flexible permanent magnetic strip 17 is secured in position in depression 16 by a suitable adhesive (not shown). Pins 15 which are about one-eighth of an inch in diameter extend upwardly about one-quarter of an inch. Their diameter is such that they snugly receive the one-eighth inch openings disposed along the edges of the data processing web. Pins 15 may be molded in place or, alternatively, may be manufactured separately and inserted in matching openings in the peg board 14 or otherwise suitably secured thereto. If inserted, they may be provided with a pluralty of equally spaced longitudinal grooves which, being wider from point to point across than the diameter of the hole in which pressed into place, engage the sides of the hole in tight frictional grip.

Figure 3:
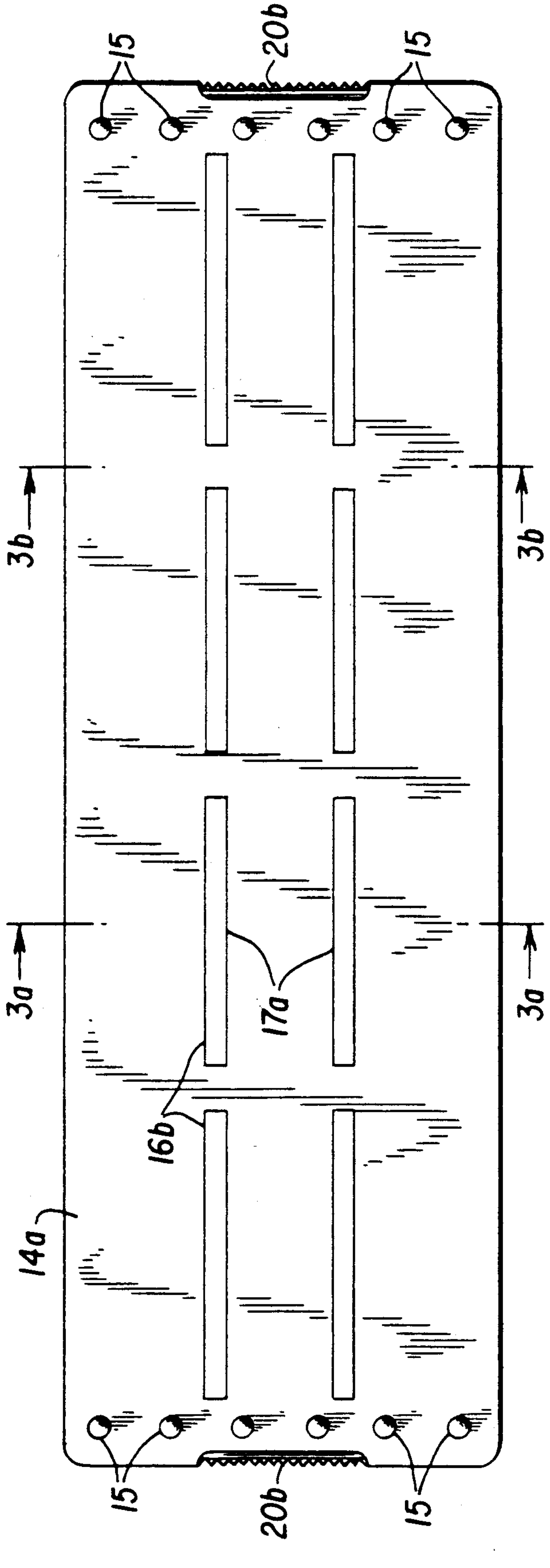
FIG. 3 shows an alternate embodiment of the peg board in plan view and cross-section.
Figure 3B:
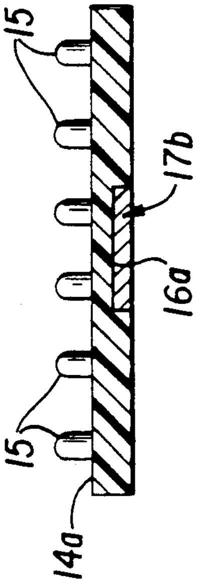
FIG. 3*b* is a cross-sectional view taken on lines 3*b*—3*b* of FIG. 3.
Figure 3A:
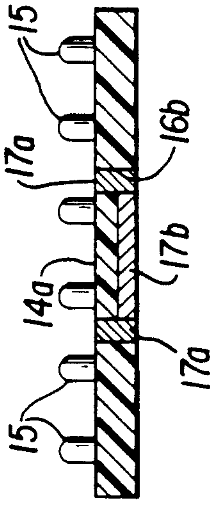
FIG. 3*a* is a cross-sectional view taken on lines 3*a*—3*a* of FIG. 3.
Figure 3C:
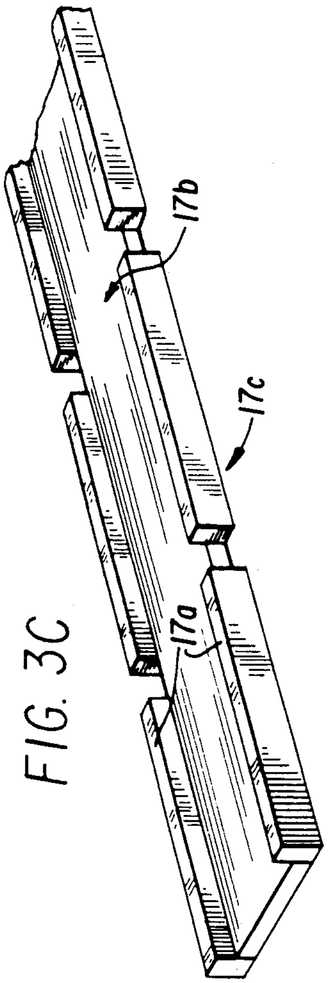
FIG. 3C is a perspective view illustrating the relationship of the magnet and connecting soft iron strips shown in FIGS. 3, 3*a* and 3*b* above.

An alternative construction is disclosed in FIG. 3 wherein instead of depression 16, an elongated rectangular groove 16*a* is provided on the underside of peg board 14*a* and joins four sets of aligned parallel slots 16*b* that extend perpendicularly through board 14*a*. Slots 16*b* receive eight preferably soft iron strips 17*a* secured in their lower aspects to a permanent magnet 17*b* which may be Alnico (trademark for an alloy containing chiefly aluminum, nickel and cobalt and having oustanding properties as a permanent magnet) or a ceramic magnet. Together they comprise a magnetic unit 17*c* as seen in FIG. 3C which fits flush with the top and bottom surfaces of peg board 14*a*. Here the serrated edges 20*b* may comprise a short saw blade which is attached to the shorter edges of peg board 14*a* by epoxy and with sufficient part of the serrations 20*b* extending upwardly to permit ripping or cutting tape extending over same. Iron strips 17*a* joined with magnet 17*b* into unit 17*c* provide an interior rectangular area (as seen in plan from the bottom) which is one inch wide and eight and three fourths inches in length.

Figure 4:
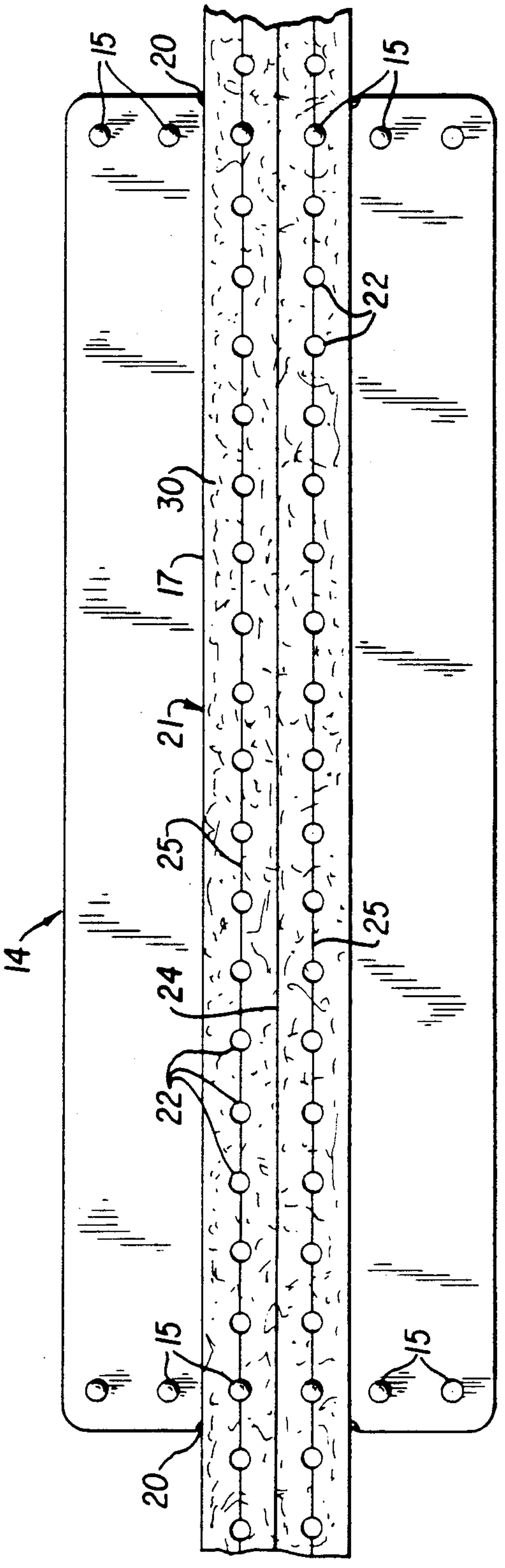
FIG. 4 illustrates a tape in accordance with the invention received on the peg board shown in FIGS. 1 and 2.

In FIG. 4, peg board 14 has an elongated ribbon or tape 21 extending across same so that its corresponding openings 22 are received on pins 15. It will be noted that tape 21 is about or slightly less than the same width, one inch, as magnetic strip 17. Tape 21 also includes a layer of non-permanent pressure sensitive adhesive material 30. Openings 22 are exactly 0.5 inches apart transversely and 0.50087 inches apart longitudinally, center to center. Tape 21 is normally placed on peg board 14 so that the adhesive material 30 faces upwardly.

It will also be noted that two parallel lines 25 have been printed or inscribed on tape 21 on the adhesive side 30. There is also a central line 24. Lines 25 extend through the centers of openings 22 on one side of the tape. The lines 25 and line 24 are spaced one-quarter of an inch apart and lines 25 are each one-quarter of an inch from the edge of the tape 21 and parallel thereto. The central line 24 depicts where the edges of the data processing sheet webs should extend. Lines 25 are for the purpose of aligning material such as envelopes which may be held between tape 21 and data processing form webs secured by tape 21 to the webs.

Figure 4A:
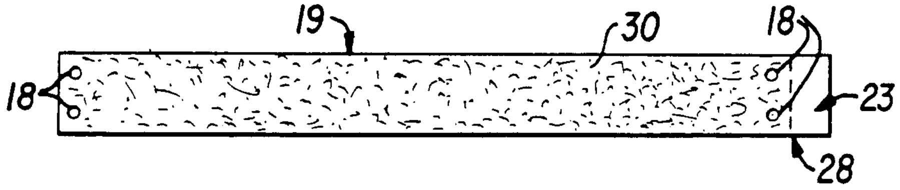
FIG. 4A illustrates an alternative form of a splicing strip in accordance with the invention.

In FIG. 4A, a tape or strip 19 including non-permanent pressure sensitive adhesive 30 and openings 18 disposed for receipt of pins 15, the same as openings 22 receiving same in FIG. 4. Tape or strip 19 is precut and therefore more precisely termed a "strip" which may be similar in composition and structure to known removable self-stick paper available in pad form. Strips 19 may, however, be in rolls with backing paper which is perforated to permit separation across the shorter edges. It also preferably includes a magnetically attracted material. An advantage of strip 19 is that it can be manufactured in a manner similar to a web 26 and have its openings 18 formed by similar equipment and does not require the molded in or built in cutter edges (20, FIG. 1). Strip 19 is provided with a perforated tear off tab 23 to facilitate the removal of the spliced paper from the retaining base. However, the strip is usable without the tab and, in fact, the strip can be reused a number of times after the tab has been removed during its first use. Where backing is provided, perforations 28 need not extend through the backing.

Figure 5:
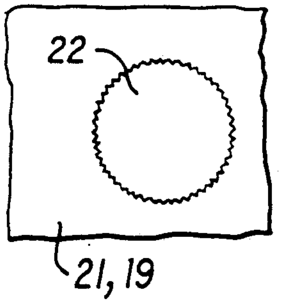
FIG. 5 is an enlarged view illustrating the serrated edges of the openings in the tape or strip shown in FIG. 4 and 4A.

FIG. 5 shows, in somewhat exaggerated form, that the openings 22 in tape 21 or openings 18 in strip 19 are not perfectly circular openings in the sense that the edges form a smooth circle, as such, but rather the edges are serrated about a circle to enhance the capacity of such openings to be held firmly on pins 15 as desired. This allows a certain tolerance for slightly different distances between openings 22 which tolerance is increased somewhat by providing longitudinal saw-tooth grooves spaced equally around pins 15 to match the serrated edges of openings 22. The invention will function (although with less efficiency) without these serrations.

Figure 6:
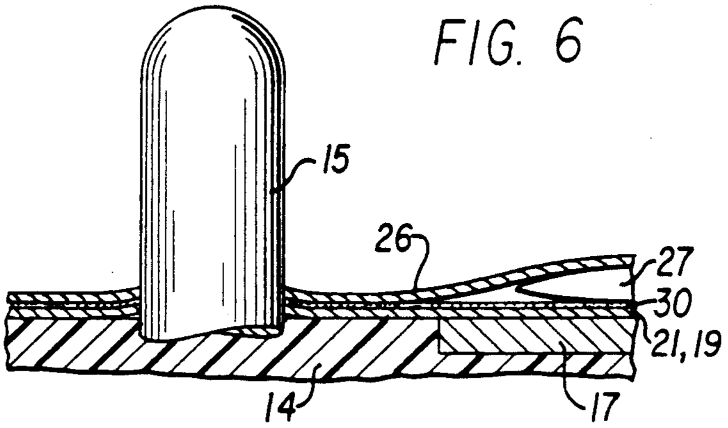
FIG. 6 is an enlarged side elevation of a peg or pin showing in cross-section a portion of a tape or strip received over same in accordance with the invention.

FIG. 6 shows a cross-section of peg board 14 at a pin 15 wherein tape 21 or strip 19 is held on pin 15 and is adhering on its upper side to the data processing form web 26 and to an envelope 27 or other matter secured thereto via adhesive 30 of tape 21 or strip 19. Tape 21 or strip 19 is provided with a magnetically attracted material dispersed therein such as powdered iron or magnetite or other ferrous material which is readily attracted to magnetic strips 17. It also preferably has on one side a non-permanent pressure sensitive adhesive 30 whereby it adheres to the web 26 and holds envelope 27 or other material as desired. The magnetically attracted material can be incorporated in the paper portion of the tape by addition to the slurry during manufacture of the paper, or in the adhesive material, or in a separate layer adhering to the paper. In practice, it has been included successfully in the adhesive material adhered to the paper tape as powdered iron, or barium ferrite, or magnetite.

Figure 4B:
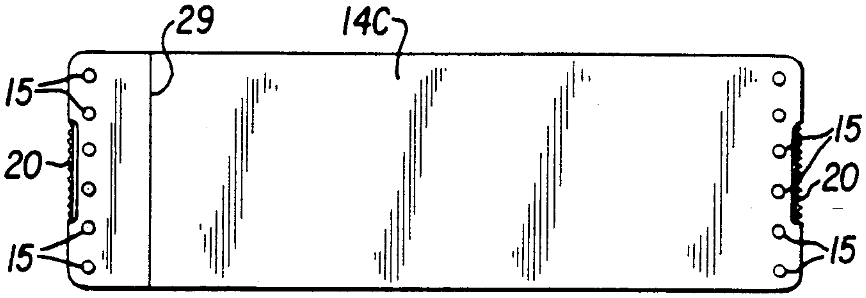
FIG. 4B is plan view of a peg board similar to that shown in FIG. 1 without a magnetic strip.
Figure 4C:
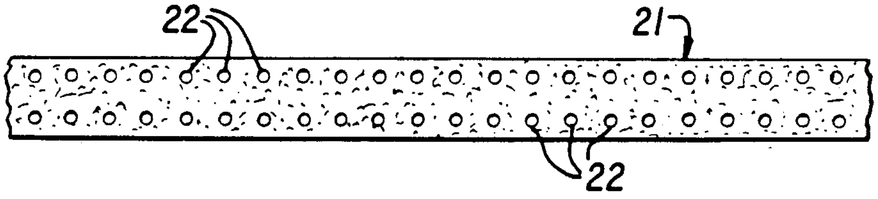
FIG. 4C depicts the splicing tape of the invention per se.
Figure 4D:
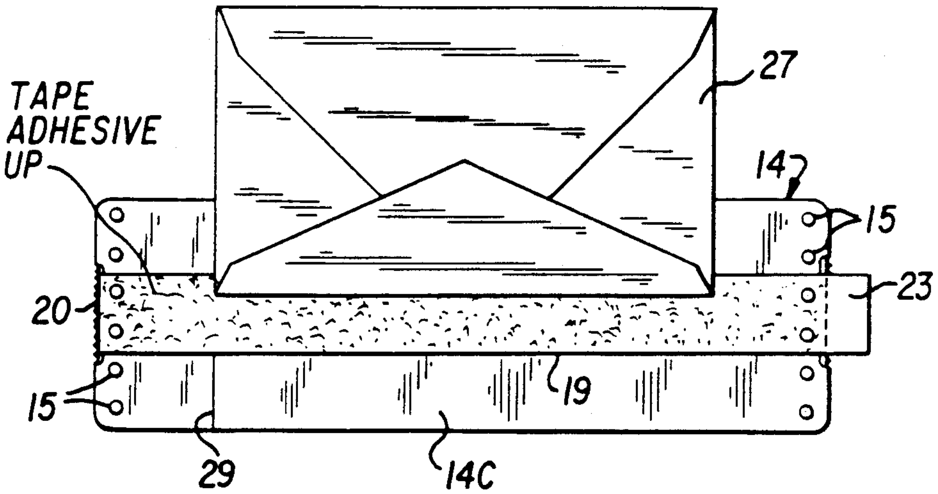
FIG. 4D is a plan view showing an envelope mounted on the peg board of FIG. 4B by means of strip as shown in FIG. 4A.

For aligning envelope 27, a guide line 29 may be provided as shown in FIGS. 4B and 4D. Different guide lines may be used for different sized envelopes.

It will be appreciated that when the edges of two webs 26 are to be joined, tape 21 or strip 19 is placed so that the adhesive material 30 is usually on its upper side as shown in FIG. 6 for the purpose of attaching an envelope, check, or like material to the web. However, in some arrangements, the web or webs may be applied to boards 14 first and the tape, adhesive side down, placed thereon. Also it will further be appreciated that the parallel lines 24 and 25 may be imprinted on both sides of the tape although it is more important that they be on the adhesive side of tape 21 or strip 19.

Figure 7:
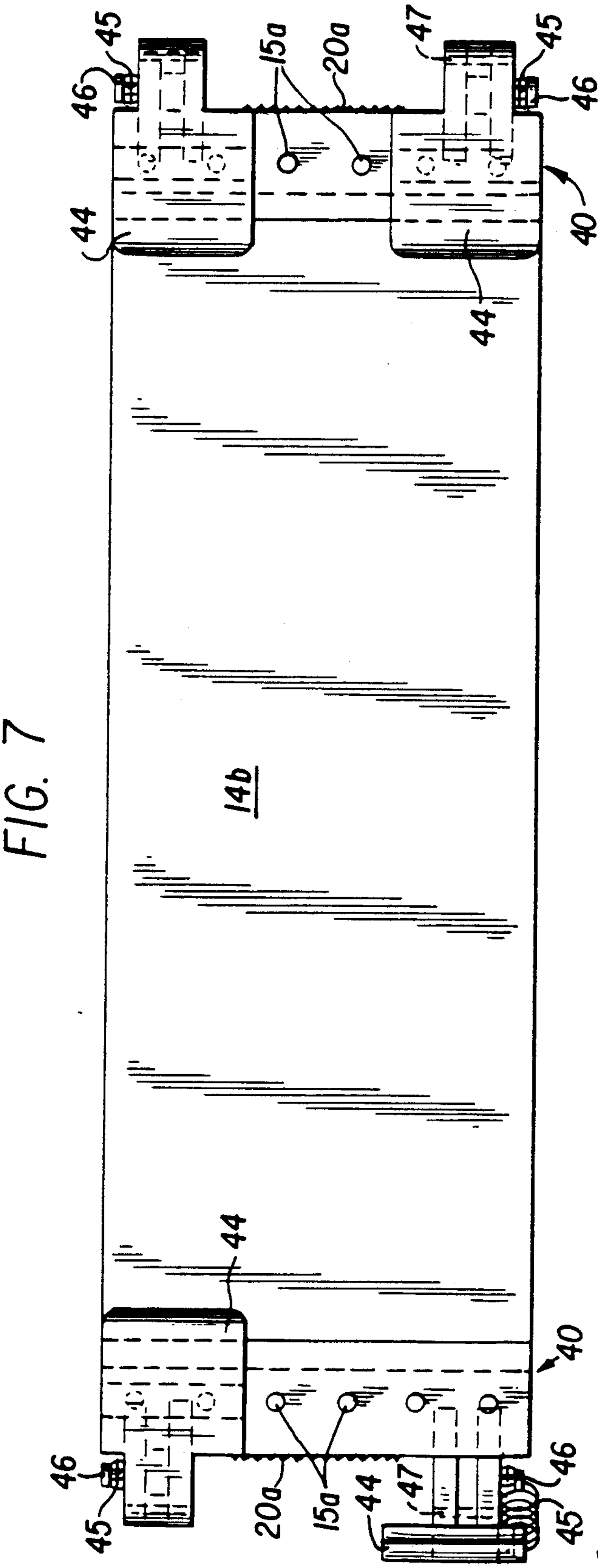
FIG. 7 is a plan view similar to FIG. 1 of a still further embodiment of the peg board.
Figure 8:
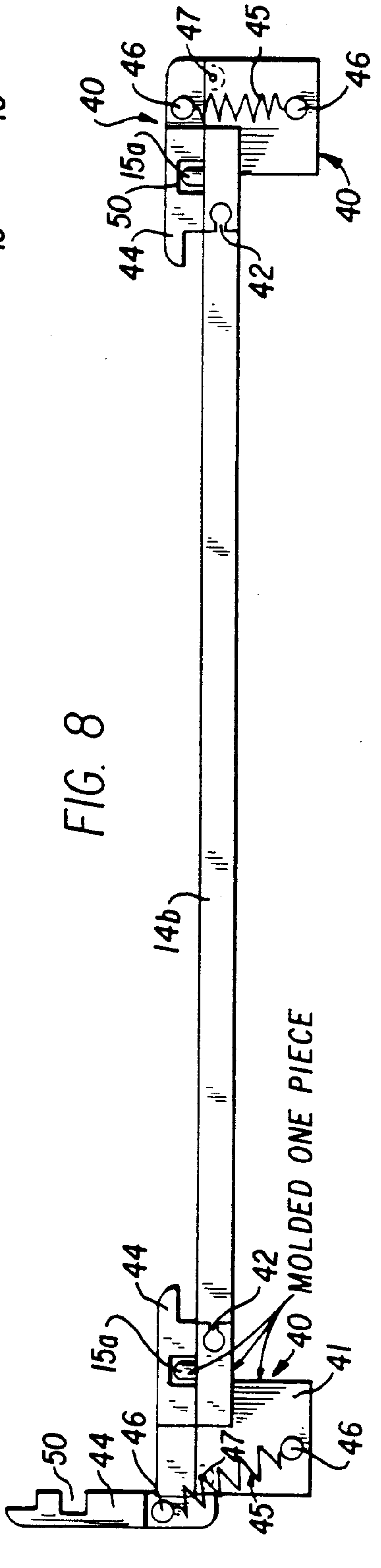
FIG. 8 is a side elevation of the peg board shown in FIG. 7.

When tape 21 or strip 19, is being used to splice together two edges of data processing form webs, the tape is placed with adhesive side in a position to be received by the horizontal edges of webs 26 with openings 22 being received on pins 15 or, in embodiments shown in and FIGS. 7 and 8, on pins 15*a*. In FIG. 4, tape 21 is aligned not only by pins 15 but also by magnetic strip 17.

With the two edges of the data processing form web adhering to tape 21, the portions of tape 21 overlapping the shorter edges of board 14 are torn off across serrations 20 which may be accomplished earlier if desired. The now spliced ends of the webs are raised from peg board 14 and from pins 15 and carried through the printer of the word processing equipment so spliced. If strip 19 is used, then tear off tab 23 is used to facilitate lifting the spliced ends of the web from pins 15, after which tab 23 is torn at the perforation.

In the event that it is desired to tape envelopes, checks, or other like material to the data processing form web, such tape (or strip) is placed on peg board 14 with the adhesive side 30 up as shown in FIG. 6. An envelope is then placed in the appropriate location guided by lines 24 or 25 and 29 and openings 22 or both on tape 21 or strip 19 as shown in FIG. 4D. Web 26 is next placed over the adhesive so that the tape or strip adheres both to the envelope or other like material and also to the overlying web. Holes 22, lines 24 and line 25 of tape 21 (or similar lines which may be applied to strip 19) are used for the purpose of aligning the envelope to ensure that the tape does not cover more of the envelope than desired and to set the distance of the side margins from the edges of the envelope, check or like material. Other parallel and perpendicular lines may be added to lines 24 and 25 for aligning material secured thereto or may be marked or etched on the peg board itself. Tape 21 or strip 19 tends to be held in its correct disposition by the attraction between the magnetic strip 17 and the magnetically attracted material in tape 21 or strip 19. Again, the edges of the tape 21 are torn off across the serrated cutting edges 20 on each side and the web may be pressed firmly in place against the tape and envelope to ensure the latter is firmly secured as desired to web 26 before the peg board is carefully removed from behind with the envelope held in place on the web by the tape.

It will be appreciated that tapes 21 or strips 19 can be used without the necessity of providing a magnetic strip 17 in peg board 14 in which event said board is flat such as without depression 16. In such case, tape 21 or strip 19 does not, of course, require that magnetically attracted material be incorporated therein.

FIGS. 7 and 8 disclose a further embodiment wherein a peg board **14*b* is provided with a pair of end clips 40. Each end clip 40 comprises an integral base piece 41. Each base piece 41 forms a rabbet for tongue and groove joint 42 with a corresponding shorter edge of peg board 14*b*. Base piece 41 also includes, molded as a single piece, six pins 15*a*. These are positioned to receive the perforations of data processing form webs in the same manner as pins 15. A plurality of serrations 20*a* are also molded into base piece 41** as a cutting edge.

Each base piece 41 of end clip 40 has hinged thereto via hinge connections 47 a holding piece 44. Each holding piece 44 is also connected to base 41 by means of a tension spring 45 which is held by pegs 46 attached respectively to base piece 41 and holding piece 44 relative to their hinge connections 47 so as to provide a toggle effect whereby holding piece 44 has two stable positions, either upright as shown on the left hand side of FIG. 8 or horizontal as shown on the right hand side of the same figure. Each holding piece 44 includes a transverse groove 50 or a series of holes which receives, in the horizontal position of holding piece 44, the underlying pins **15*a***.

It will be appreciated that the rabbet connections 42 can be, in effect, snap connections whereby different size boards or inserts **14*b*** can then be inserted to accommodate different widths of data processing form webs.

Figure 6A:
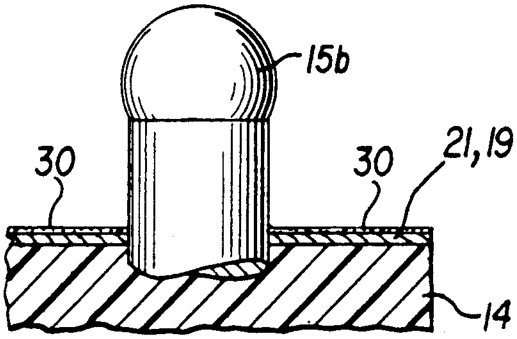
FIG. 6A is an enlarged side elevation of an alternate embodiment of the peg or pin which depicts in cross-section a portion of a tape or strip received over same in accordance with the invention.
Figure 6B:
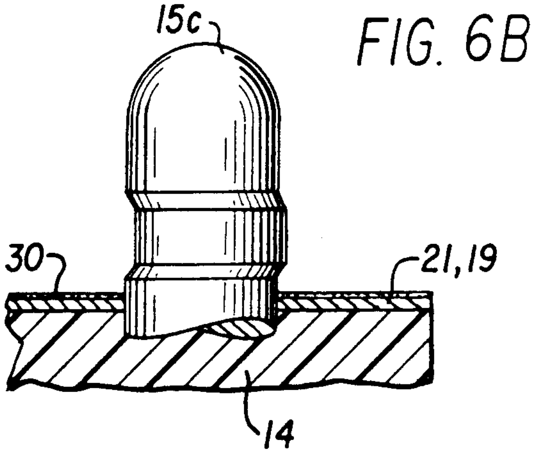
FIG. 6B is an enlarged side elevation of a further embodiment of the peg or pin that portrays in cross-section a portion of the tape or strip received thereover in the same manner as FIG. 6 and 6A.

Although the use of the magnetic strip 17 together with tape 21 or strip 19 containing magnetically attracted material is definitely preferable inasmuch as it serves to position and hold the various components together and in place; the tape or strip on the non-magnetic board is held in place by making the holes 22 in said tape or strip one sixty-fourth of an inch smaller than pegs 15. The stretching of the smaller holes 22 on to pegs 15 creates a friction fit sufficient to hold tape 21 or strip 19 in place on the peg board. Alternatively the pegs on the non-magnetic board otherwise the same as boards 14, **14*a* and 14*b* can be shaped as shown in FIG. 6A and 6B as peg 15*b* or peg 15*c* to hold tape 21 or strip 19 in place. In FIG. 6A, peg 15*b* is slightly wider at the top to ensure that tape 12 or strip 19 is unlikely to slip off of the peg accidentally. In FIG. 6B, peg 15*c*** is provided with an offset which serves the same purpose.

Clips 40 in the embodiments shown in FIGS. 7 and 8 retain the edges of the webs in place and a magnetic strip 17 in the board **14*b* or magnetically attracted material in tape 21 or strip 19** is not necessary.

For different widths of webs, boards such a peg boards 14 shown in the embodiments of FIGS. 1 and 2 are sufficiently inexpensive to manufacture that it is preferable to simply have different sizes of boards for each different web width. However, various sizes may be accommodated by providing slide rule like connections with appropriate stops so that different widths of data processing form webs can be accommodated thereon. Another system is shown in U.S. Pat. No. 4,390,389 of Bunas et al issued June 28, 1983, which involves a sliding member having pegs thereon which can be moved rectilinearly relative to fixed pegs or pins. Of course the embodiment shown in FIGS. 7 and 8 provides a change in size by interchanging different size (length) inserts **14*b* between the end clips 40**.

The foregoing detailed description should be understood as having been provided for clearness of understanding only and not to impart unnecessary limitations inasmuch as equivalent structures and modifications will become obvious to those skilled in the art in view of the foregoing disclosure. For example, wherein it is intended that webs be permanently spliced together, permanent adhesive may be used on the tapes or strips.

Having disclosed my invention, what I claim as new and to be secured by Letters Patent of the United States is:

1. For combination with a paper transport assembly for a printer having a type of paper feed mechanism which includes a pair of spaced sprockets for advancing webs of paper having regularly spaced perforations at their opposite side edges for engaging said sprockets, a tape for connecting a first web of paper to a second web of paper, the tape comprising an elongated ribbon of flexible material, said ribbon having a width which is greater than the distance between two adjacent of said perforations along each of said web's edges plus the diameters of said adjacent perforations, said tape having pairs of regularly spaced openings of slightly less diameter than said perforations extending longitudinally along said ribbon, each said pair of openings being the same distance apart as said perforations and of substantially the same configuration as said perforations, a layer of adhesive means on one side of said tape so that said tape is adapted to be fastened to said first web's end edge and to said second web's end edge to mate said first web's end edge with said second web's end edge in a manner that said mating end edges are interconnected by being connected to the adhesive means of said tape, two of said pairs of openings being in respective juxtaposition with the uppermost and lowermost perforations of said first web and said second web to receive said spaced sprockets as the interconnected first and second webs are advanced through said paper transport assembly, said openings being generally circular and having a diameter of about one-eighth of an inch, the openings in each said pair being one-half inch apart center to center and successive said pairs extending longitudinally along said ribbon being 0.50087 inch apart center to the next adjacent center.

2. A tape in accordance with claim 1 comprising magnetic material for combination with means for positioning the tape relative to said mating end edges which comprises magnetic attraction means.

3. A tape in accordance with claim 1 wherein said tape is approximately one inch wide and is inscribed with a line which extends longitudinally and is centered on the adhesive side.

4. A tape in accordance with claim 1 wherein said adhesive means comprises a non-permanent pressure sensitive adhesive.

5. For combination with a paper transport assembly for a printer having a type of paper feed mechanism which includes a pair of spaced sprockets for advancing webs of paper having regularly spaced perforations at their opposite side edges for engaging said sprockets, a tape for connecting a first web of paper to a second web of paper, the tape comprising an elongated ribbon of flexible material, said ribbon having a width which is greater than the distance between two adjacent of said perforations along each of said web's edges plus the diameters of said adjacent perforations, said tape having pairs of regularly spaced openings of slightly less diameter than said perforations extending longitudinally along said ribbon, each said pair of openings being the same distance apart as said perforations and of substantially the same configuration as said perforations, a layer of adhesive means on one side of said tape so that said tape is adapted to be fastened to said first web's end edge and to said second web's end edge to mate said first web's end edge with said second web's end edge in a manner that said mating end edges are interconnected by being connected to the adhesive means of said tape, two of said pairs of openings being in respective juxtaposition with the uppermost and lowermost perforations of said first web and said second web to receive said spaced sprockets as the interconnected first and second webs are advanced through said paper transport assembly, said openings being generally circular and having a diameter of about one-eighth of an inch, the openings in each said pair being about or exactly one-half inch apart center to center and successive said pairs extending longitudinally along said ribbon being about but not exactly one-half inch apart center to the next adjacent center, said generally circular openings in said ribbon having their circumferences defined by serrated edges.

6. For combination with a paper transport assembly for a printer having a type of paper feed mechanism which includes a pair of spaced sprockets for advancing webs of paper having regularly spaced perforations at their opposite side edges for engaging said sprockets, a tape for connecting a first web of paper to a second web of paper, the tape comprising an elongated ribbon of flexible material, said ribbon having a width which is greater than the distance between two adjacent of said perforations along each of said web's edges plus the diameters of said adjacent perforations, said tape having pairs of regularly spaced openings of slightly less diameter than said perforations extending longitudinally along said ribbon, each said pair of openings being the same distance apart as said perforations and of substantially the same configuration as said perforations, a layer of adhesive means on one side of said tape so that said tape is adapted to be fastened to said first web's end edge and to said second web's end edge to mate said first web's end edge with said second web's end edge in a manner that said mating end edges are interconnected by being connected to the adhesive means of said tape, two of said pairs of openings being in respective juxtaposition with the uppermost and lowermost perforations of said first web and said second web to receive said spaced sprockets as the interconnected first and second webs are advanced through said paper transport assembly, said openings being generally circular and having a diameter of about one-eighth of an inch, the openings in each said pair being about or exactly one-half inch apart center to center and successive said pairs extending longitudinally along said ribbon being about but not exactly one-half inch apart center to the next adjacent center, said ribbon being inscribed with a pair of lines which are each about one-fourth inch from an edge of said ribbon and are inscribed on said adhesive side of said ribbon between said perforations.

7. A tape for splicing together the ends of computer printer paper which has a plurality of regularly spaced perforations disposed along its lateral edges for receiving sprocket projections in the computer's printer, the tape comprising an elongated strip provided with adhesive means on at least one side and having a plurality of sets of pairs of regularly spaced openings which openings are slightly smaller than said perforations, said sets of pairs being closely spaced together by equal distances along the length of the tape, each opening of said pair of openings being adjacent to the edge of said strip opposite the other opening of said pair of said openings and the openings of each said pair are spaced apart substantially the same distance as said perforations so that said tape can be superimposed over the respective transverse widths of said ends to be spliced together and said perforations adjacent said ends to be spliced together with two of said sets of said pairs of said openings matching with two of said perforations adjacent said ends to affix the openings of said two sets to said latter perforations to be received by said sprocket projections while retaining said ends in juxtaposition as they are drawn through said computer's printer, said openings being longitudinally spaced 0.50087 inches apart center to center and said equal distance that said pairs are closely spaced together consisting of one-half inch from the openings of adjacent pairs center to center.

8. A tape in accordance with claim 7 comprising magnetic material.

9. A tape in accordance with claim 8 wherein said magnetic material is mixed with said adhesive means.

10. A tape in accordance with claim 9 wherein said magnetic material comprises magnetite which has been mixed into said adhesive after being powdered.

11. A tape for splicing together the ends of computer printer paper which has a plurality of regularly spaced perforations disposed along its lateral edges for receiving sprocket projections in the computer's printer, the tape comprising an elongated strip provided with adhesive means on at least one side and having a plurality of sets of pairs of regularly spaced openings which openings are slightly smaller than said perforations, said sets of pairs being closely spaced together by equal distances along the length of the tape, each opening of said pair of said openings being adjacent to the edge of said strip opposite the other opening of said pair of said openings and the openings of each said pair being spaced apart substantially the same distance as said perforations so that said tape can be superimposed over the respective transverse widths of said ends to be spliced together and said perforations adjacent said ends to be spliced together with two of said sets of said pairs of said openings disposed to match with two of said perforations located adjacent to each other at each of said ends to affix the openings of said two sets to said latter perforations to be received by said sprocket projections while retaining said ends in juxtaposition as they are drawn through said computer's printer, the circumference of said openings being defined by serrated edges.

12. A strip of flexible material for being connected to a paper web which is adapted to be drawn through a computer's printer, the web having perforations along both opposite side edges for receiving spaced sprockets of said printer, the strip being of elongated rectangular configuration having a longitudinal length substantially equal to the transverse width of said web and having at least two openings at each end of its length which are spaced apart the same distance as said perforations so that oppositely disposed said openings are capable of simultaneously receiving said spaced sprockets, adhesive material covering substantially one entire surface of the strip's flexible material, a tear-off tab being provided at one end of said strip that extends transversely outwardly from said web.

13. A strip in accordance with claim 12, which comprises material which is attracted by magnetic lines of force.

14. A strip in accordance with claim 12, wherein said flexible material is paper and said adhesive material is a pressure sensitive adhesive.

15. For a combination with a paper transport assembly for a printer having a type of paper feed mechanism which includes a pair of spaced sprockets for advancing webs of paper having regularly spaced perforations at their opposite side edges for engaging the said sprockets, a tape for connecting a first web of paper to a second web of paper, the tape comprising an elongated ribbon of flexible material, said ribbon having a width which is greater than the distance between said perforations along each of said web's edges plus the diameters of said perforations, said tape having pairs of regularly spaced openings of slightly less diameter than said perforations extending longitudinally along said ribbon, each said pair of openings being the same distance apart as said perforations and of substantially the same configuration as said perforations, a layer of adhesive means on one side of said tape so that said tape is adapted to be fastened to said first web's end edge and to said second web's end edge to mate said first web's end edge with said second web's end edge in a manner that said mating end edges are interconnected by being connected to the adhesive means of said tape, two of said pairs of openings being in respective juxtaposition with the uppermost and lowermost perforations of said first web and said second web to receive said spaced sprockets as the interconnected first and second webs are advanced through said paper transport assembly, said openings being generally circular and having a diameter of about one-eighth of an inch, the openings of each said pair being about one-half inch apart center to center and successive said pairs extending longitudinally along said ribbon also being about one-half inch apart center to the next adjacent center, said generally circular openings in said ribbon having their circumferences defined by serrated edges.

16. For a combination with a paper transport assembly for a printer having a type of paper feed mechanism which includes a pair of spaced sprockets for advancing webs of paper having regularly spaced perforations at their opposite side edges for engaging the said sprockets, a tape for connecting a first web of paper to a second web of paper, the tape comprising an elongated ribbon of flexible material, said ribbon having a width which is greater than the distance between said perforations along each of said web's edges plus the diameters of said perforations, said tape having pairs of regularly spaced openings of slightly less diameter than said perforations extending longitudinally along said ribbon, each said pair of openings being the same distance apart as said perforations and of substantially the same configuration as said perforations, a layer of adhesive means on one side of said tape so that said tape is adapted to be fastened to said first web's end edge and to said second web's end edge to mate said first web's end edge with said second web's end edge in a manner that said mating end edges are interconnected by being connected to the adhesive means of said tape, two of said pairs of openings being in respective juxtaposition with the uppermost and lowermost perforations of said first web and said second web to receive said spaced sprockets as the interconnected first and second webs are advanced through said paper transport assembly, said openings being generally circular and having a diameter of about one-eighth of an inch, the openings of each said pair being about one-half inch apart center to center and successive said pairs extending longitudinally along said ribbon also being about one-half inch apart center to the next adjacent center, said ribbon being inscribed with a pair of lines which are each about one-fourth inch from an edge of said tape and are inscribed on said adhesive side of said tape between said perforations.

* * * * *